United States Patent [19]

Thorpe

[11] 4,346,906

[45] Aug. 31, 1982

[54] ROLL PALLET

[75] Inventor: Joseph F. Thorpe, Somerset, England

[73] Assignee: Cheddar Valley Engineering Limited, England

[21] Appl. No.: 162,494

[22] Filed: Jun. 24, 1980

[30] Foreign Application Priority Data

Jun. 26, 1979 [GB] United Kingdom ............... 7922229

[51] Int. Cl.$^3$ ............................................. B62B 3/02
[52] U.S. Cl. ........................... 280/33.99 H; 280/79.3
[58] Field of Search ................ 280/33.99 H, 33.99 R, 280/79.1 R, 79.3; 211/195, 198

[56] References Cited

U.S. PATENT DOCUMENTS 3,191,959 6/1965 Heimbruch et al. ............... 280/79.3
3,840,242 10/1974 Craig et al. ................... 280/33.99 H

FOREIGN PATENT DOCUMENTS 1454034 10/1976 United Kingdom .

Primary Examiner—Richard A. Bertsch
Assistant Examiner—Donald W. Underwood
Attorney, Agent, or Firm—Larson and Taylor

[57] ABSTRACT

A roll pallet comprises a frame (2), an end wall (4) and a deck (10). Also, there may be two side walls (8) pivotally connected to the end wall (4). The deck (10) can be pivoted into a raised position in which it is parallel to the end wall (4), and the side walls (8) can be folded inwardly. The pallet can then be nested, for storage, with another similar pallet, by virtue of the shape of the frame (2), which comprises two converging limbs (16). The frame (2) is provided with wheels (20, 22) and the deck (10) is provided with stabilizing wheels (24) which resist toppling of the pallet when it is carrying a load.

7 Claims, 4 Drawing Figures

ROLL PALLET

BACKGROUND OF THE INVENTION

This invention relates to a roll pallet.

Roll pallets are used for moving goods about in places such as warehouses and supermarkets. They usually comprise a wheeled deck to which walls are fitted to prevent goods from falling off the deck. When the pallets are not in use, the walls are removed from the decks so that the decks can be stacked one above the other to reduce the storage space required. However, removal and re-fitting of the walls is tiresome and time consuming.

Roll pallets which are capable of nesting one with another are known from British Pat. No. 1 454 034 and U.S. Pat. No. 3,840,242. These disclose pallets in which the deck can be pivoted upwardly from a frame so that the frames can fit one into another. Necessarily, the frames are tapered for this purpose, and the result is that the deck, when down, overhangs the frame. Consequently, the pallet is unstable, because the deck overhangs the frame, and the loaded pallet is liable to tip over.

SUMMARY OF THE INVENTION

According to the present invention there is provided a roll pallet comprising a frame, an end wall secured to the frame, and a load carrying deck connected pivotally to the frame for movement between a load-bearing position, in which it is generally parallel to the ground on which the pallet stands, and a raised position, in which it is generally parallel to the end wall, the frame being provided with wheels for supporting the pallet on the ground, and the deck being provided with stabilizing wheels which are disposed on or adjacent the ground when the deck is in the load-bearing position, the configuration of the frame being such that the pallet can nest with a similar pallet at the same vertical level when the deck is in the raised position.

In a preferred construction, the pallet has, in addition to the end wall, two side walls which are pivotally connected to the end wall. The side walls, like the deck, can be folded against the end wall to enable the pallet to be nested with another similar pallet without removing the walls.

DETAILED DESCRIPTION OF A PREFERRED EMBODIMENT

Figure 1:
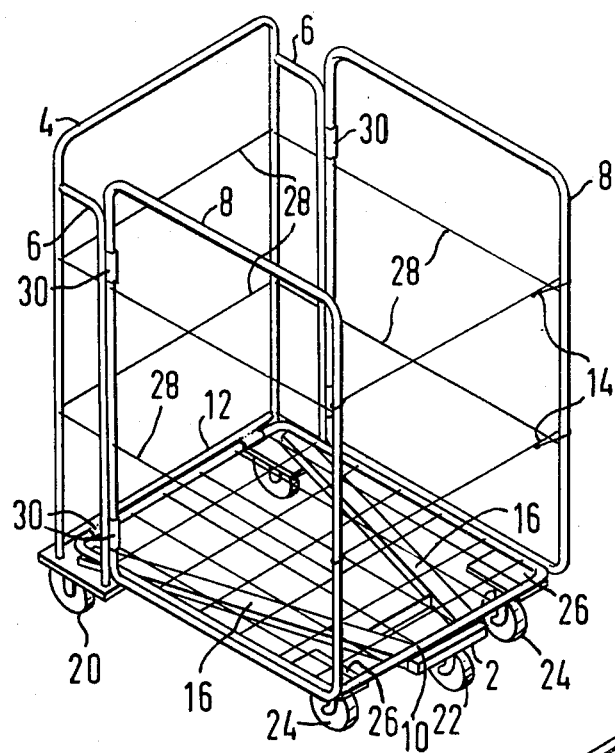
FIG. 1 is a perspective view of a roll pallet ready for carrying loads.

The roll pallet illustrated in the Figures comprises a frame 2 to which an end wall 4 is rigidly secured. The end wall 4 has side members 6 which project perpendicular to the plane of the end wall 4. A side wall 8 is pivotally connected to each projection 6. A rectangular deck 10 is pivotally connected to a member 12 at the bottom of the end wall 4. The ends of the side walls 8 away from the end wall 4 are interconnected by rope tensioners 14.

Figure 3:
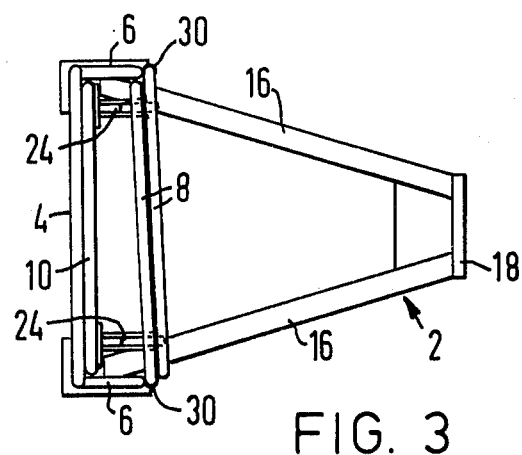
FIG. 3 is a plan view of the pallet in the folded condition shown in FIG. 2.

The frame 2, as can be seen more clearly in FIG. 3, is generally V-shaped. It has two limbs 16, each connected at one end to the bottom of the end wall 4. The limbs 16 converge in the direction away from the end wall 4, and their ends away from the end wall 4 are interconnected by a short cross piece 18. The frame 2 is made from steel members of square cross-section. Fixed-axis wheels 20 are mounted on the ends of the limbs 16 adjacent the end wall 4, and a swivel castor 22 is mounted on the cross-piece 18. Further swivel castors 24 are mounted on plates 26 which form part of the deck 10. With the deck 10 in its load-bearing position as shown in FIG. 1, the castors 24 are disposed one on each side of the frame 2, at generally the same distance from the end wall 4 as the castor 22.

The end wall 4 and the side walls 8 are each constituted by a tubular steel framework which is represented in the drawings as having steel rods 28 extending across it. However, other arrangements could be used instead of the rods 28, such as wire mesh fastened to the tubular members of the walls 4 and 8.

The deck 10 comprises a rectangular framework of steel angle iron across which wire mesh extends.

The pivotal connections between the various components are constituted by cylindrical collars 30 which are welded to one of each pair of members to be interconnected and through which passes a portion of the other member.

Although not shown in Figures, it is desirable to provide means for latching the deck, in its load-bearing position, to the two side walls 8. Not only does this hold down the deck 10, but it also holds the side walls 8 at right angles to the plane of the end wall 4. Such a latching means may comprise a pair of clip-like U-shaped channel members (not shown) located on the bottom tubular members of sidewalls 8 and adapted to receive the lateral tubular members of deck 10; the latching means is thus broadly similar to the latches disclosed in U.S. Pat. Nos. 3,840,242 (Craig, Sr., et al) and 3,191,959 (Heimbruch et al).

In use of the pallet, the goods to be carried are placed on the deck 10 which itself rests on the frame 2. The presence of the side walls 8 and the end wall 4 mean that the goods can be piled on the deck 10 to a height of several feet and yet they will be prevented from falling off the deck. The rope tensioners 14 also secure the goods, as well as assisting in holding the side walls 8 in their desired load-retaining positions. The swivel castors 22 and 24 allow the pallet to be manoeuvred easily.

The castors 24 perform a stabilizing function. If they were not present, uneven loading or careless handling of the pallet could cause the pallet to topple over by pivoting about the castor 22 and one of the wheels 20. This is because there is a significant overhang of the deck 10 beyond the frame 2. The castors 24, however, stabilize the pallet and resist such toppling. Although in the embodiment described the deck 10 rests on the frame 2 in the load-bearing position, with the castors 22 and 24 all engaging the ground, it would be possible for the deck 10 to be clear of the frame 2 and be supported on the ground at the front by the castors 24 alone. Alternatively, the deck 10 could rest on the frame 2 with the castors 24 normally clear of the ground. In this case, the castor 22 would be the sole ground support for the front of the deck, and the castors 24 would only touch the ground if the pallet were tilted.

Figure 2:
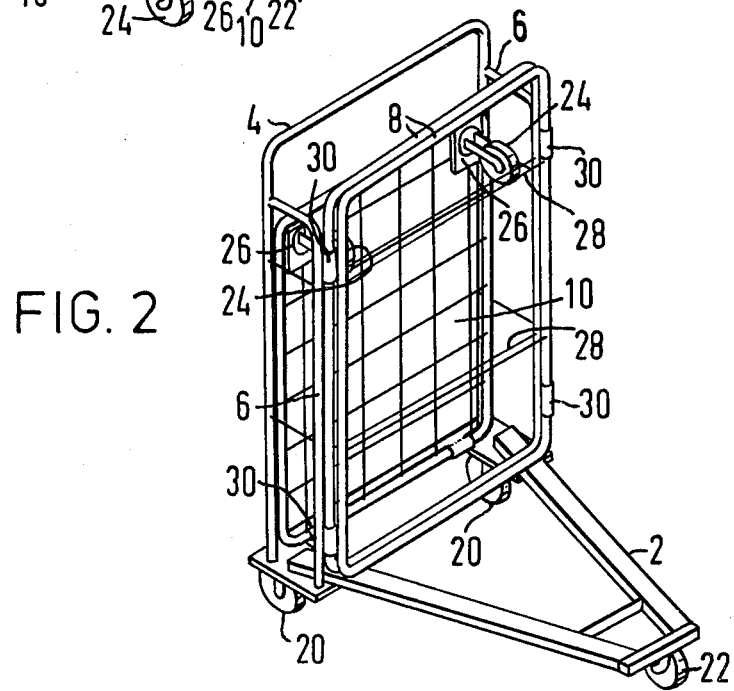
FIG. 2 is a perspective view of the pallet of FIG. 1 in a folded condition ready for nesting with another similar pallet.
Figure 4:
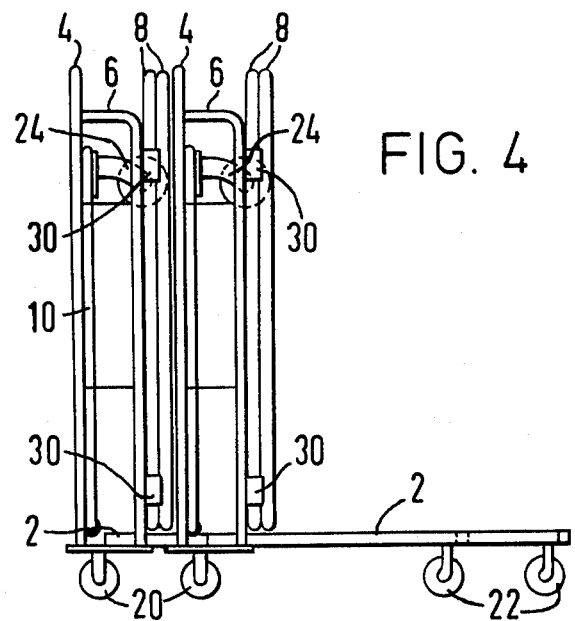
FIG. 4 is a side view of two nested pallets.

When the pallet of FIG. 1 is not in use, it can be stored with other similar pallets by folding it into the condition shown in FIGS. 2 and 3 and nesting it with other pallets as shown in FIG. 4. To fold the pallet, any locking means between the side walls 8 and the deck 10 is released and the deck 10 is pivoted upwardly into a raised position in which it is parallel to and lies flat against the end wall 4. The side walls 8 are then pivoted one after the other until they too are parallel to the end wall 4. The presence of the projections 6 means that there will be a gap between the side walls 8 and the end wall 4, within which the deck 10, with its castors 24, will be accommodated (see FIG. 3). It will be appreciated that the length of each side wall 8 must be generally the same as, or less than, that of the end wall 4. The configuration of the frame 2 is such that it can be fitted between the limbs 16 of a similar frame, as shown in FIG. 4. A large number of pallets can thus be stored in a relatively small space without removing the walls 4 and 8.

Instead of using the rope tensioners 14, it is possible to provide a fourth wall which may be pivotally connected to one or other of the side walls 8 so that it can be folded up for storage.

I claim:

1. A roll pallet comprising
   a frame including two limbs which converge from one end of the frame to the other,
   a plurality of wheels provided on the frame for supporting the pallet on the ground, said wheels comprising two wheels disposed at the said one end of the frame and a further wheel disposed at the other end of the frame,
   an end wall secured to the frame at the said one end of the frame,
   a load-carrying deck pivotably connected to the frame at the said one end of the frame, and
   stabilizing wheels provided on the deck at locations away from the region of connection of the deck to the frame
   the deck being movable between a load-bearing position in which the deck is generally parallel to the ground on which the pallet stands with the stabilizing wheels then being on or adjacent the ground for this position, and a raised position in which the deck is generally parallel to the end wall, the convergent limbs of the frame being such that these limbs can enter between the corresponding limbs of a similar pallet at the same vertical level when the deck is in the raised position thereof.

2. A roll pallet as claimed in claim 1, in which the deck is rectangular and the stabilizing wheels are mounted at the corners of the deck away from the end wall.

3. A roll pallet as claimed in claim 1, further comprising side walls which are pivotally connected one to each end of the end wall, each side wall being movable from a load-retaining position, in which it is perpendicular to the plane of the end wall, into a folded position, in which it is parallel to the plane of the end wall.

4. A roll pallet as claimed in claim 3, in which the length of each side wall is generally the same as or less than the length of the end wall.

5. A roll pallet as claimed in claim 3, in which each side wall is connected to a respective side member of the end wall, the side members projecting from the end wall in a direction perpendicular to the plane of the end wall.

6. A roll pallet as claimed in claim 3, in which, in its raised position, the deck is disposed between the end wall and the side walls, when the side walls are in their folded positions.

7. A roll pallet as claimed in claim 1, the frame further comprising a cross-member which interconnects the ends of the limbs at the said one end of the frame.

* * * * *